(12) United States Patent
Kobayashi et al.

(10) Patent No.: US 10,698,207 B2
(45) Date of Patent: Jun. 30, 2020

(54) VEHICLE DISPLAY DEVICE

(71) Applicant: Toyota Jidosha Kabushiki Kaisha, Toyota-shi, Aichi-ken (JP)

(72) Inventors: Atsuko Kobayashi, Nagoya (JP); Noritaka Toyama, Anjo (JP); Keiko Nagatomi, Toyota (JP); Keisuke Ito, Okazaki (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 16/267,559

(22) Filed: Feb. 5, 2019

(65) Prior Publication Data

US 2019/0243132 A1 Aug. 8, 2019

(30) Foreign Application Priority Data

Feb. 7, 2018 (JP) .................................. 2018-020510

(51) Int. Cl.
*G02B 27/01* (2006.01)
*B60K 37/02* (2006.01)
*B60K 35/00* (2006.01)

(52) U.S. Cl.
CPC .............. *G02B 27/01* (2013.01); *B60K 35/00* (2013.01); *B60K 37/02* (2013.01); *B60K 2370/1523* (2019.05); *B60K 2370/1529* (2019.05); *B60K 2370/334* (2019.05)

(58) Field of Classification Search
None
See application file for complete search history.

(56) References Cited

U.S. PATENT DOCUMENTS

2015/0321606 A1* 11/2015 Vartanian ........... G02B 27/0101
348/148
2017/0337871 A1* 11/2017 Kurokawa ............. B60K 37/02

FOREIGN PATENT DOCUMENTS

JP 2008-265475 A 11/2008

* cited by examiner

*Primary Examiner* — Kenneth B Lee, Jr.
(74) *Attorney, Agent, or Firm* — Dinsmore & Shohl LLP

(57) ABSTRACT

A vehicle display device includes: one or more display devices configured to: display a main image on a vehicle cabin interior side of a front windshield in a non-occupant-driven state; and display a sub image corresponding to a content of the main image on an instrument panel in the non-occupant-driven state.

7 Claims, 4 Drawing Sheets

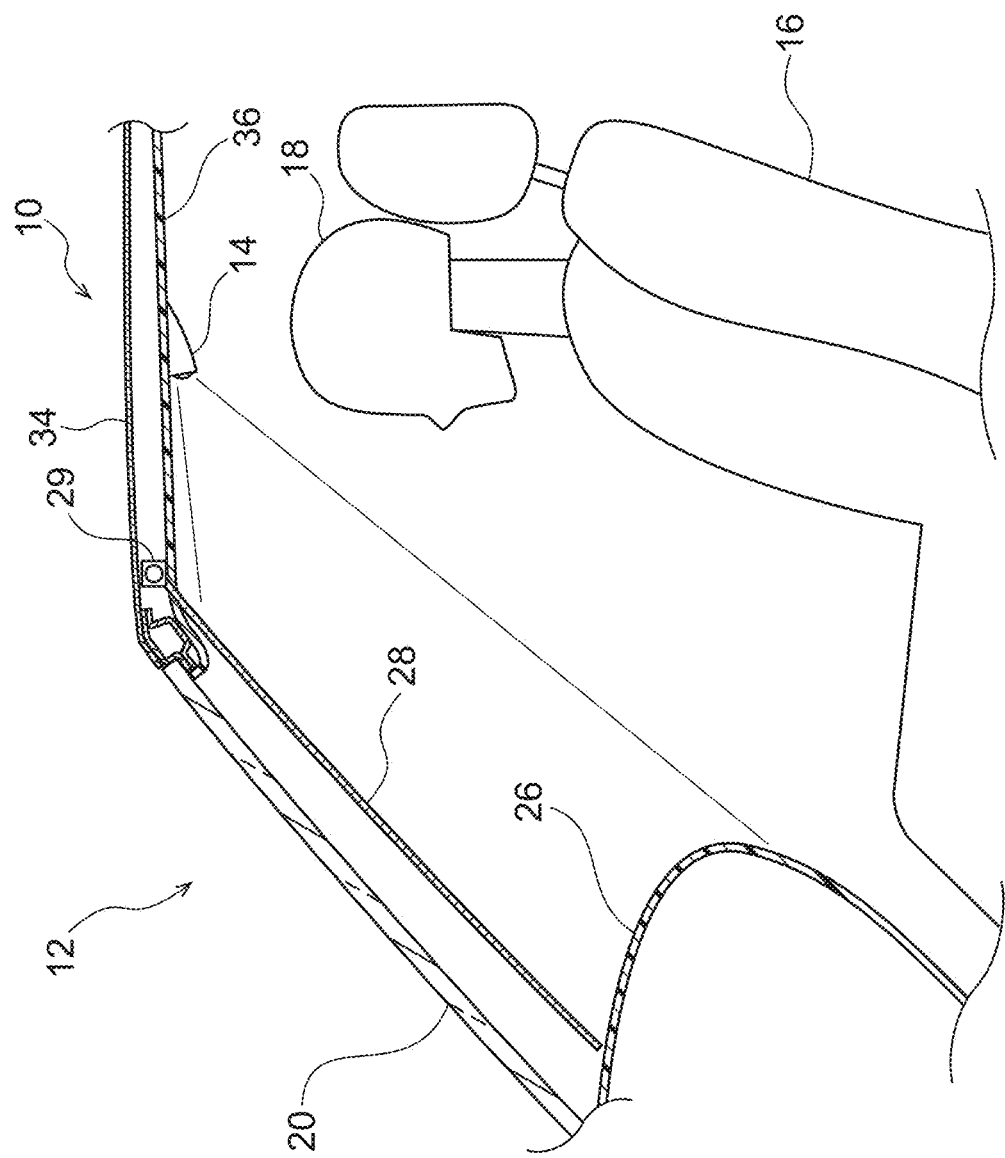
FIG.1
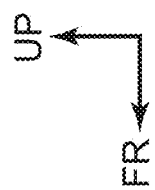

VEHICLE DISPLAY DEVICE

CROSS-REFERENCE TO RELATED APPLICATION

This application is based on and claims priority under 35 USC 119 from Japanese Patent Application No. 2018-020510 filed on Feb. 7, 2018, the disclosure of which is incorporated by reference herein.

BACKGROUND

Technical Field

The present disclosure relates to a vehicle display device.

Related Art

Technology has been disclosed in which a front windshield of a vehicle is employed as a display device for displaying an image (for example, see Japanese Patent Application Laid-Open (JP-A) No. 2008-265475).

However, in the above technology, when an occupant views an image displayed on the front windshield, it is conceivable that interior components unrelated to the image, such as an instrument panel, might also enter the field of vision of the occupant.

SUMMARY

The present disclosure provides a vehicle display device capable of displaying an image on a front windshield so as to be able to heighten the sense of realism of the image.

A vehicle display device according to a first aspect includes one or more display devices configured to: display a main image on a vehicle cabin interior side of a front windshield in a non-occupant-driven state; and display a sub image corresponding to a content of the main image on an instrument, panel in the non-occupant-driven state.

In this vehicle display device, the main image is displayed on the vehicle cabin interior side of the front windshield by the one or more display devices in the non-occupant-driven state. The sub image corresponding to the content of the main image is displayed on the instrument panel by the one or more display devices in the non-occupant-driven state. Combining the main image and the sub image enables the image to be extended. Moreover, an occupant may be suppressed from becoming aware of the instrument panel as an interior component.

Note that the "vehicle cabin interior side of the front windshield" on which the main image is displayed is either a projection screen provided at the vehicle cabin interior side of the front windshield, or is a display device with its own display screen. The "non-occupant-driven state" refers to a state in which the vehicle is stationary and not ready to move, or to an autonomous driving state in which driving by the driver is unnecessary.

A second aspect is the vehicle display device according to the first aspect, wherein the one or more display devices comprises at least one projector that is configured to project the main image onto the vehicle cabin interior side of the front windshield and to project the sub image onto the instrument panel.

In this vehicle display device, the at least one projector of the one or more display devices projects the main image onto the vehicle cabin interior side of the front windshield, and projects the sub image onto the instrument panel. Employing the same type of equipment, i.e. a projector, as the one or more display devices simplifies the configuration. Note that a single projector, or plural projectors, may be provided.

A third aspect is the vehicle display device according to the second aspect, further including a light-blocking device that is configured to block input of external light from a vehicle exterior to the vehicle cabin interior side.

In this vehicle display device, even when it is bright outside the vehicle, input of external light from the vehicle exterior to the vehicle cabin interior side is blocked by the light-blocking device, enabling the main image and the sub image projected by the projector to be viewed by an occupant. When it is dark outside the vehicle, the occupant may view the projected main image and sub image without employing, the light-blocking device.

A fourth aspect is the vehicle display device of the second aspect or the third aspect, wherein the at least one projector is configured as a single projector.

In this vehicle display device, the projector is configured as a single device, further simplifying the configuration.

A fifth aspect is the vehicle display device according to the first aspect, wherein the one or more display devices comprises a first display provided to the front windshield, and a second display provided to the instrument panel.

In this vehicle display device, the main image is displayed on the first display provided to the front windshield, and the sub image is displayed on the second display provided to the instrument panel. Namely, images are directly displayed on regions of the front windshield and the instrument panel.

The first aspect enables the sense of realism of an image to be heightened in a vehicle display device capable of displaying an image on a front windshield.

The second aspect enables the sense of realism of the image to be heightened with a simple configuration.

The third aspect enables the sense of realism of the image to be heightened regardless of the brightness outside the vehicle.

The fourth aspect enables the sense of realism of the image to be heightened with an even simpler configuration.

The fifth aspect enables the sense of realism to be heightened while achieving a clearer image.

BRIEF DESCRIPTION OF THE DRAWINGS

FIG. 1 is a cross-section view illustrating an example of a vehicle display device according to an exemplary embodiment.

DETAILED DESCRIPTION

Figure 2:
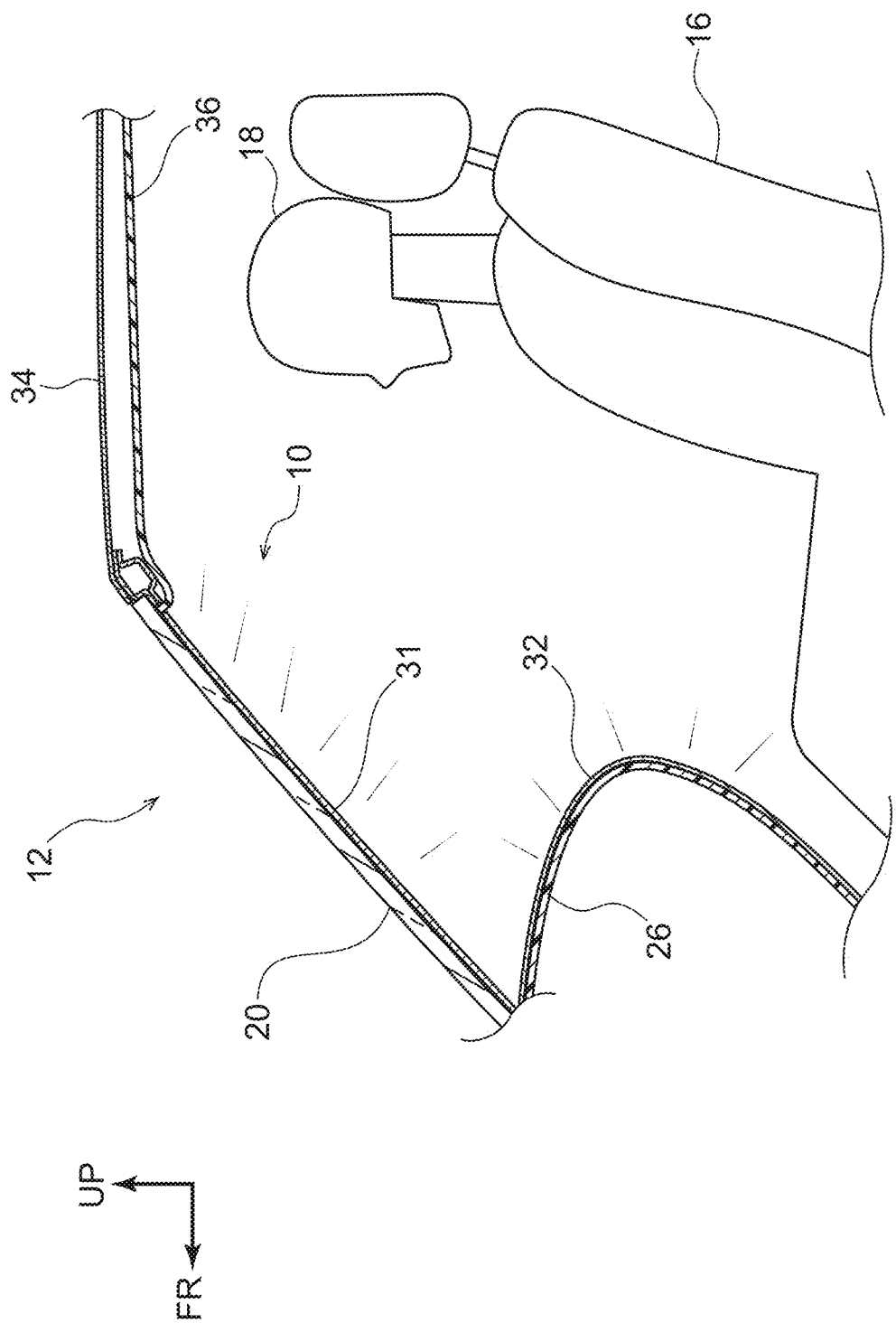
FIG. 2 is a cross-section view illustrating another example of a vehicle display device according to an exemplary embodiment.

Explanation follows regarding an exemplary embodiment of the disclosure, based on the drawings. In the drawings, the arrow FR indicates the front of a vehicle, the arrow UP indicates the vehicle upper side, and the arrow RH indicates the vehicle right-hand direction.

In FIG. 1, a vehicle display device 10 according to an exemplary embodiment is a display device provided to a vehicle 12, and includes a projector 14 serving as an example of one or more display devices. The vehicle display device 10 is a device for displaying an image at the vehicle front of a seat 16 of the vehicle 12, for example. An occupant 18 seated in the seat 16 is able to view the image.

Figure 3:
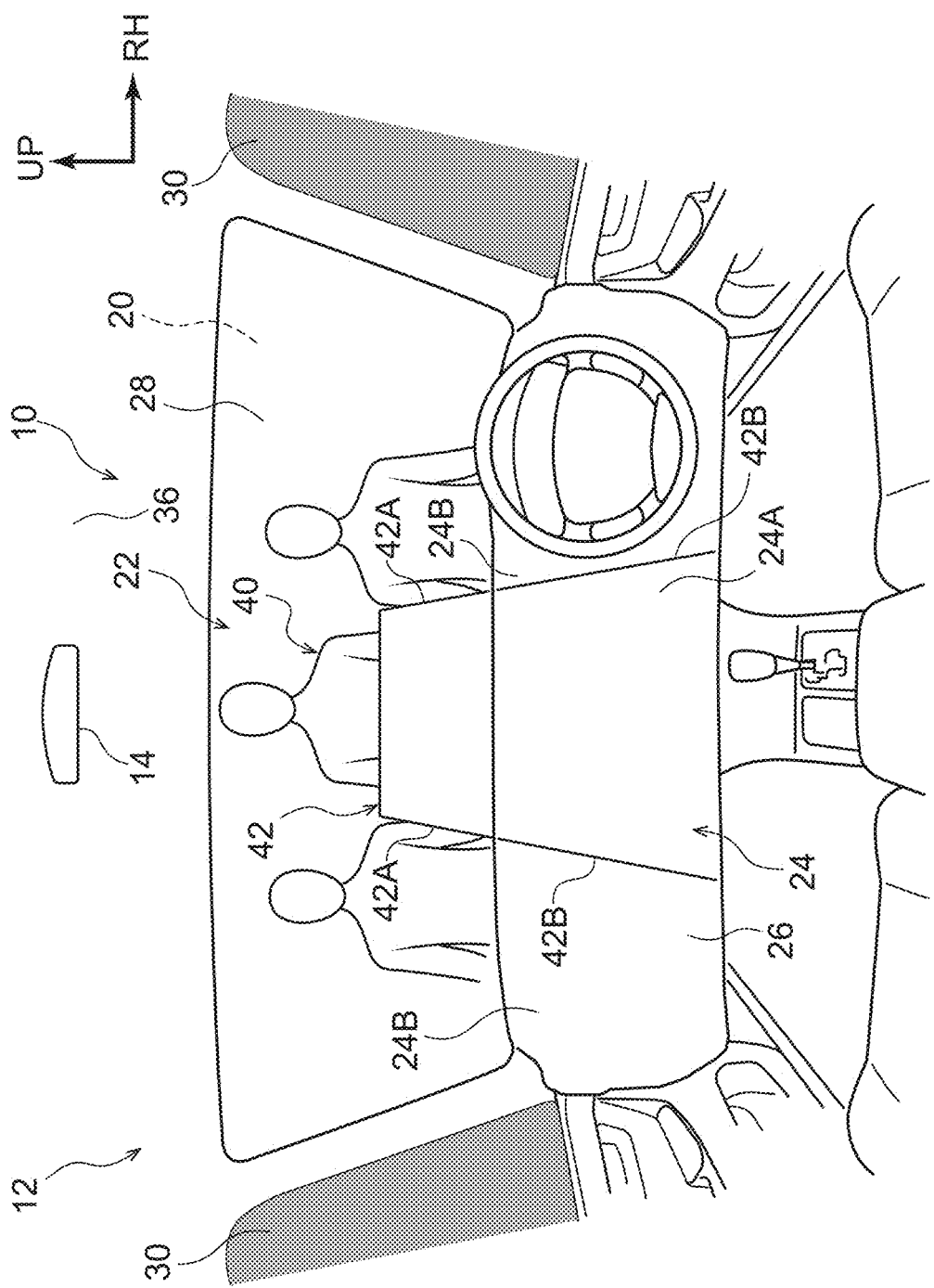
FIG. 3 is a face-on view illustrating an example of a vehicle display device according to an exemplary embodiment employed in a video conference.
Figure 4:
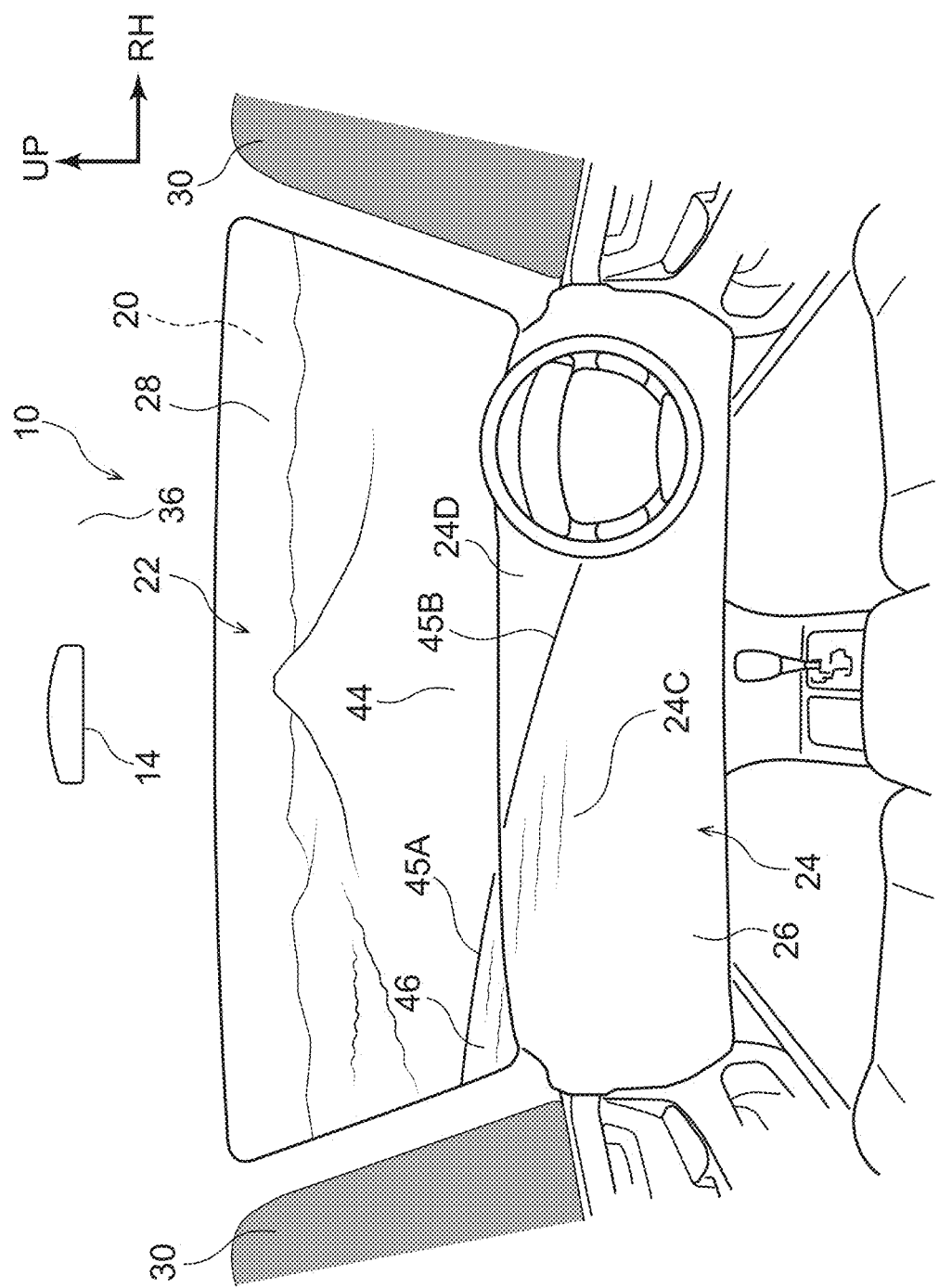
FIG. 4 is a face-on view illustrating an example of a vehicle display device according to an exemplary embodiment employed to display an image.

In a non-occupant-driven state, the projector 14 displays a projection of a main image 22 at a vehicle cabin interior side of front windshield 20 (see FIG. 3 and FIG. 4). In the non-occupant-driven state, the projector 14 displays a projection of a sub image 24 corresponding to the content of the main image 22 on an instrument panel 26 (see FIG. 3 and FIG. 4). Namely, the single projector 14 projects the main image 22 onto the vehicle cabin interior side of the front windshield 20, and projects the sub image 24 onto the instrument panel 26. Projection mapping technology may be employed to project the main image 22 and the sub image 24. The projector 14 is attached to, for example, a lower face of a ceiling interior member 36, but may be attached between a roof panel 34 and the ceiling interior member 36 in order to avoid jutting out toward the vehicle cabin interior side.

Note that the "vehicle cabin interior side of the front windshield 20" on which the main image 22 is displayed is either a projection screen, provided at the vehicle cabin interior side of the front windshield 20, or a display device with its own display screen. A first display 31 such as that illustrated in FIG. 2 is an example of a display screen in its own right.

The main image 22 may be various types of image, such as an image of a video conference as illustrated in FIG. 3, or a still image or moving image as illustrated in FIG. 4. The sub image 24 is an image that corresponds to the content of the main image 22, and that extends or widens the main image 22. The sub image 24 is an artificial or virtual image generated by a controller, not illustrated in the drawings. In the example illustrated in FIG. 3, for example, the main image 22 is an image of a video conference, and includes an image of participants 40 and a meeting room table 42. In the example illustrated in FIG. 4, the main image 22 is a still image or a moving image of a landscape, and includes an image of land 44 and sea 46. The controller generates an artificial image that is similar to the main image 22, and outputs this image as the sub image 24.

The "non-occupant-driven state" refers to a state in which the vehicle 12 is stationary and not ready to move, or to an autonomous driving state in which driving by the driver is unnecessary. The following two cases are conceivable examples of "a state in which the vehicle 12 is stationary and not ready to move". The first example is a state in which, in cases in which the vehicle 12 has an automatic transmission, a shift (gear) lever is in a P (parking) range, and a parking brake has been activated. The second example is a state in which, in cases in which the vehicle 12 has a manual transmission, a shift lever is in neutral, and a parking brake has been activated.

In order to display a projection of the main image 22 on the vehicle cabin interior side of the front windshield 20, a projection screen 28 may be disposed at the vehicle cabin interior side of the front windshield 20. The screen 28 is capable of being rolled up by a take-up section 29 provided to a ceiling section of the vehicle 12. Namely, the screen 28 may be disposed on the vehicle cabin interior side of the front windshield 20 when the projector 14 is being used, and is capable of being rolled up by the take-up section 29 and stowed when the projector 14 is not being used. The take-up section 29 is provided in a space between the roof panel 34 and the ceiling interior member 36, for example. The screen 28 may be disposed on the vehicle cabin interior side of the front windshield 20 through an opening or a through-portion provided in the ceiling interior member 36. The screen 28 may be unrolled (pulled out) and rolled up either manually or automatically.

Alternatively, as a first display device of the one or more display devices, a transparent liquid crystal display (not illustrated in the drawings) may be provided on the vehicle cabin interior side of the front windshield 20 instead of the screen 28, enabling a region of the front windshield 20 to be employed as a screen by activating the transparent liquid crystal display.

There is no limitation to a single projector 14, and plural projectors may be provided. In cases in which plural projectors (not illustrated in the drawings) are employed, the projectors may be collectively disposed at a single location, or may be disposed dispersed between plural locations.

When it is bright outside the vehicle, such as during the daytime, the main image 22 and the sub image 24 projected by the projector 14 may be difficult to see. The vehicle display device 10 therefore includes a light-blocking device 30 that blocks the input of external light from the outside the vehicle to the vehicle cabin interior side. In FIG. 3 and FIG. 4, the light-blocking device 30 is provided at the inner side of side glass in order to block the passage of light through the side glass. Curtains, or a transparent liquid crystal display (not illustrated in the drawings) may be employed as the light-blocking device 30. The light-blocking device 30 may also be provided to other windows, such as the front windshield 20 or rear glass (not illustrated in the drawings).

Note that the one or more display devices are not limited to the projector 14. In the example illustrated in FIG. 2, the one or more display devices includes the first display 31 provided to the front windshield 20. The first display 31 is provided superimposed on the vehicle cabin interior side of the front windshield 20, for example. The one or more display devices includes a second display 32 provided to the instrument panel 26. The second display 32 is provided superimposed on a surface of the instrument panel 26. The second display 32 may curve so as to follow the shape of the instrument panel 26, or may be configured of plural panels disposed alongside each other (not illustrated in, the drawings).

A transparent liquid crystal display, for example, may be employed as the first display 31. A transparent liquid crystal display, a non-transparent liquid crystal display, an organic EL display, or the like may be employed as the second display 32.

Operation

Explanation follows regarding operation of the exemplary embodiment configured as described above. In the non-occupant-driven state of the vehicle display device 10 according to the exemplary embodiment as illustrated in FIG. 3, the main image 22 is displayed on the vehicle cabin interior side of the front windshield 20 by the projector 14. The main image 22 is an image of a video conference, and includes an image of the participants 40 and the meeting room table 42. In the non-occupant-driven state, the sub image 24 that corresponds to the content of the main image 22 is displayed on the instrument panel 26 by the projector 14. Combining the main image 22 and the sub image 24 enables the image to be extended.

Specifically, the controller recognizes that edges 42A of the table 42 in the main image 22 are being cut off at a lower end of the main image 22, and extension lines 42B of the edges 42A are generated and included in the sub image 24. Moreover, the controller recognizes the coloring of a lower edge portion of the main image 22 and includes a region with the same coloring in the sub image 24. Specifically, the coloring of the table 42 is applied to a region 24A between the extension lines 42B on either side of the sub image 24. If the table 42 has a woodgrain effect, then the region 24A is also applied with a woodgrain effect. If the table 42 is white, then the region 24A is also set to white. The coloring surrounding the participants 40 (the coloring of the background of the meeting room) is applied to regions 24B at the vehicle width direction outer sides of the extension lines 42B. The scene around the other party of the video conference therefore appears to extend onto the instrument panel 26. This enables the sense of realism of the image to be heightened.

In the example illustrated in FIG. 4, the main image 22 is a still image or a moving image of scenery, and includes the images of the land 44 and the sea 46. The controller recognizes that a boundary line 45A between the land 44 and the sea 46 is cut off at a lower end of the main image 22, and generates an extension line 45B of the boundary line 45A to be included in the sub image 24. The controller also recognizes the coloring of a lower edge portion of the main image 22, and includes a region with the same coloring in the sub image 24. Specifically, the coloring of the sea 46 is applied to a region 24C of the sub image 24 at the vehicle lower side of the sea 46 and at the vehicle lower side of the extension line 45B. Moreover, the coloring of the land 44 is applied to a region 24D of the sub image 24 at the vehicle upper side of the extension line 45B. The scenery in the main image 22 therefore appears to extend onto the instrument panel 26. This enables the sense of realism of the image to be heightened.

Displaying the sub image 24 on the instrument panel 26 enables the occupant 18 to be suppressed from becoming aware of the instrument panel 26 as an interior component. The same type of equipment, i.e., the projector 14, is employed as the one or more display devices, simplifying the configuration. In the exemplary embodiment, the projector 14 is configured by a single device, such that the configuration is further simplified.

Even when it is bright outside the vehicle, input of external light from the vehicle exterior to the vehicle cabin interior side is blocked by the light-blocking device 30, enabling the main image 22 and the sub image 24 projected by the projector 14 to be viewed by the occupant 18. When it is dark outside the vehicle, the occupant 18 may view the projected main image 22 and sub image 24 without employing the light-blocking device 30. This enables the sense of realism of the image to be heightened, regardless of the brightness outside the vehicle.

In the example illustrated in FIG. 2, the main image 22 (FIG. 3, FIG. 4) is displayed on the first display 31 provided to the front windshield 20, and the sub image 24 (FIG. 3, FIG. 4) is displayed on the second display 32 provided to the instrument panel 26. Namely, the images are directly displayed on regions of the front windshield 20 and the instrument panel 26. This enables the sense of realism to be heightened, while making the image clearer. When the displays on the first display 31 and the second display 32 are bright, the main image 22 and the sub image 24 may be viewed even if it is bright outside the vehicle, and so the light-blocking device 30 (FIG. 3, FIG. 4) does not need to be employed.

Other Exemplary Embodiments

An exemplary embodiment of the present disclosure has been explained above; however, exemplary embodiments of the present disclosure are not limited to those described above, and obviously various modifications may be implemented within a range not departing from the spirit of the present disclosure.

For example, in the above exemplary embodiment the controller generates the sub image 24 based on the main image 22; however, the sub image 24 may be prepared in advance. In other words, the main image 22 may include information (data) of the sub image 24. Furthermore, although an image of a video conference, and an image of scenery have been given as examples of the main image 22, the main image 22 is not limited to these. For example, the vehicle display device 10 according to exemplary embodiments may display various moving images or still images, such as, movies or television programs as the main image 22.

What is claimed is:

1. A vehicle display device comprising:
one or more display devices configured to:
   display a main image on a vehicle cabin interior side of a front windshield in a non-occupant-driven state; and
   display a sub image corresponding to a content of the main image on an instrument panel in the non-occupant-driven state such that the main image is extended by the sub image, thereby forming a combined image comprising the main image and the sub image.

2. The vehicle display device of claim 1, wherein the one or more display devices comprises at least one projector that is configured to project the main image onto the vehicle cabin interior side of the front windshield and to project the sub image onto the instrument panel.

3. The vehicle display device of claim 2, further comprising a light-blocking device that is configured to block input of external light from a vehicle exterior to the vehicle cabin interior side.

4. The vehicle display device of claim 2, wherein the at least one projector is configured as a single projector.

5. The vehicle display device of claim 1, wherein the one or more display devices comprises:
a first display provided to the front windshield; and
a second display provided to the instrument panel.

6. The vehicle display device of claim 1, the one or more display devices further configured to recognize edges or boundaries of an element of the main image that are being cut off at a lower end of the main image, and generate and include extension lines of the edges or boundaries in the sub image.

7. The vehicle display device of claim 1, the one or more display devices further configured to recognize a coloring of a lower edge portion of the main image and include a region with the same coloring in the sub image.

* * * * *

UNITED STATES PATENT AND TRADEMARK OFFICE
CERTIFICATE OF CORRECTION

PATENT NO. : 10,698,207 B2
APPLICATION NO. : 16/267559
DATED : June 30, 2020
INVENTOR(S) : Atsuko Kobayashi et al.

Page 1 of 1

It is certified that error appears in the above-identified patent and that said Letters Patent is hereby corrected as shown below:

On the Title Page

Item (72), inventor 1, city, delete "Nagoya" and insert --Nagoya-shi Aichi-ken--, therefor.

Item (72), inventor 2, city, delete "Anjo" and insert --Anjo-shi Aichi-ken--, therefor.

Item (72), inventor 3, city, delete "Toyota" and insert --Toyota-shi Aichi-ken--, therefor.

Item (72), inventor 4, city, delete "Okazaki" and insert --Okazaki-shi Aichi-ken--, therefor.

In the Specification

In Column 3, Line(s) 24, after "screen", delete ",".

In Column 4, Line(s) 42, after "in", delete ",".

In Column 6, Line(s) 23, after "as", delete ",".

Signed and Sealed this
Thirteenth Day of October, 2020

Andrei Iancu
*Director of the United States Patent and Trademark Office*